Patented Apr. 18, 1939

2,154,981

UNITED STATES PATENT OFFICE 2,154,981

DYESTUFFS CONTAINING SIMULTANEOUSLY RADICALS OF ANTHRAQUINONE DYESTUFFS AND AZO DYESTUFFS AND PROCESS OF MAKING THE SAME

Hans Gubler and Eduard Bernasconi, Basel, Switzerland, assignors to the firm of Society of Chemical Industry in Basle, Basel, Switzerland No Drawing. Original application October 26, 1935, Serial No. 46,956. Divided and this application March 9, 1937, Serial No. 129,954. In Switzerland November 8, 1934

6 Claims. (Cl. 260—207)

According to this invention new dyestuffs which contain simultaneously a radical of an azo-dyestuff and of an anthraquinone-dyestuff are made by combining a dyestuff of the anthraquinone series containing at least one reactive amino-group with an amino-azo-dyestuff with the aid of phosgene or an analogue thereof, the components for the dyestuff being selected so that at least one of them contains a group which imparts solubility in water.

According to a further feature of the invention, like dyestuffs can also be made by converting an anthraquinone dyestuff containing at least one reactive amino-group with the aid of phosgene or an analogue thereof into a compound which can itself be converted into an amino-azo-dyestuff derivative either by diazotization and combination with a coupling component or by combination with a diazo-compound, and then converting the compound thus obtained into the amino-azo-dyestuff derivative according to either of these methods.

Among anthraquinone dyestuffs containing amino-groups suitable for use in the invention are included simple amino-anthraquinones as well as anthraquinone derivatives containing an amino-group in an external group, such as is the case, for instance, in aminobenzoylaminoanthraquinones or aminophenylated-aminoanthraquinones. By the expression "anthraquinone dyestuffs" are to be understood not only such products which contain the unchanged anthraquinone radical

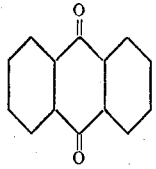

but also the dyestuffs which are quite generally regarded as anthraquinone dyestuffs, such as inter alia the dyestuffs of the dibenzanthrone, pyranthrone, pyrazolanthrone, anthanthrone and dibenzpyrene-quinone series.

By phosgene and its analogues are to be understood phosgene, in some cases in the form of an isocyanate and carbon bisulfide, in some cases in the form of mustard oils, and so on. In many cases, as will be understood, a reduction or a saponification must be applied at some suitable stage in the manufacture of the products.

Depending on the choice of the anthraquinone dyestuff and the amino-azo-dyestuff, the dyestuffs obtained in accordance with the invention may dye yellow, orange, red, violet, blue or green. It is also possible to prepare compounds which yield various brown and black shades. The new dyestuffs may be distinguished by their productivity and by the brightness and high fastness to light of their dyeings. Especially valuable are the green dyestuffs which are obtained by combining a blue element of the anthraquinone series with a yellow element of the azo series. When the new dyestuffs contain a suitable atomic grouping such as that of salicylic acid they may advantageously be converted in substance or on the fiber into complex metal compounds, such as compounds of copper or chromium.

The new dyestuffs are therefore characterized by containing, on the one hand, the radical of an amino-anthraquinone dyestuff and, on the other hand, at least once the radical of an amino-azo-dyestuff, in which dyestuffs these radicals are linked together by

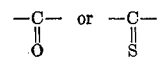

and in which further at least one of the dyestuff radicals contains at least one sulfo-group. Among these dyestuffs those are particularly valuable in which the radical of the anthraquinone dyestuff is the radical of a blue amino-anthraquinone dyestuff, and in which the radicals of the azo-dyestuffs are the radicals of yellow aminoazo-dyestuffs. Such blue amino-anthraquinone dyestuffs are for example the polyamino-anthraquinones, such as for example 1:4:5:8-tetraaminoanthraquinones, polyamino - hydroxyanthraquinones, for example the 1:4:5-triamino-8-hydroxyanthraquinones or 1:5-diamino-4:8-dihydroxyanthraquinones, further 1 - amino - 4 - amino-arylido-anthraquinones and the sulfonic acids of such compounds, such as sulfonic acids of the 1-amino-4(4'-aminophenyl)-amino-anthraquinones. As yellow aminoazo - dyestuffs there come into question quite generally those dyestuffs which may be obtained by combining a diazotized aromatic monoacidyl-diamine of the benzene series with a so-called yellow component, such as phenol, salicylic acid, the cresotinic acids, pyrazolones, such as 1-aryl-5-pyrazolones, arylides of the acetoacetic acid, di-hydroxyquinoline, methylketol, etc., and saponification of the dyestuffs thus obtained.

These dyestuffs are dark powders which dissolve in water to green-blue to green and green-olive solutions and dye cotton or quite generally textiles which consist of or contain regenerated cellulose similar tints. The dyeings are characterized by excellent fastness to light. The new dyestuffs are useful for dyeing textile materials, such as natural fibers like cotton or natural silk, for dyeing artificial silk of regenerated cellulose, for the manufacture of pigments and for coloring lacquers or varnishes. In the latter case it may be useful to precipitate the dyestuffs with the aid of suitable compounds.

The following example illustrates the invention, the parts being by weight:—

*Example*

48.9 parts of 1-amino-4-(4'-amino-3'-sulfo)-anilidoanthraquinone-2-sulfonic acid in the form of the sodium salt and 25.7 parts of 4-amino-4'-hydroxy-1:1'-azobenzene-3'-carboxylic acid are dissolved in 2000 parts of water and 15 parts of sodium carbonate are added. Then phosgene is introduced at 30–45° C. until both the components have disappeared and the unsymmetrical urea which has been formed is isolated in the usual manner. It can be obtained completely pure by dissolving it in water, filtering clear and salting out from water containing sodium carbonate. The product of the formula

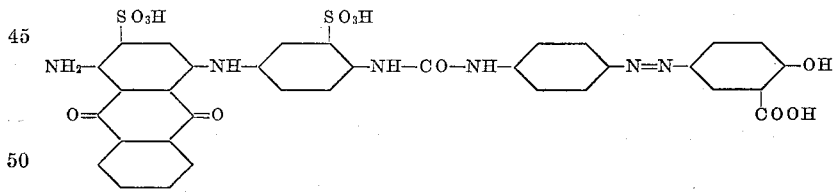

dyes cotton and regenerated cellulose, such as viscose artificial silk, pure yellow-green shades which are very fast to light.

Further green dyestuffs are obtained when using as anthraquinone components blue anthraquinone dyestuffs such as the condensation products from 1-amino-4-bromoanthraquinone-2-sulfonic acid and 1:4-diaminobenzene, 1:5-diaminobenzene, benzidine, or the condensation product of the formula

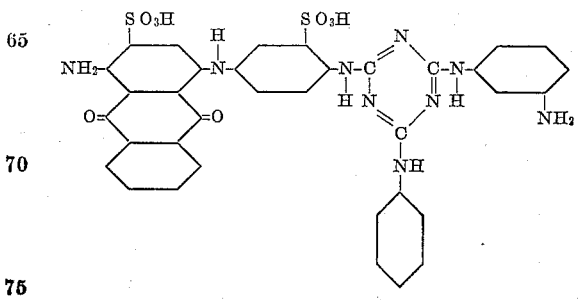

and so on, or the condensation product of 1-amino-4-bromanthraquinone-2-sulfonic acid with 1-acetylamino-3-benzene-sulfamide and subsequent saponification of the acetylamino-group, or the 1:5-dihydroxy-4:8-diaminoanthraquinone-2:6-disulfonic acid, and replacing the 4-amino-4'-hydroxy-1:1'-azobenzene-3'-carboxylic acid by the other yellow dyestuffs, such as

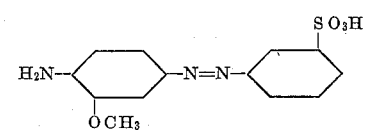

or quite generally by products of the general formula

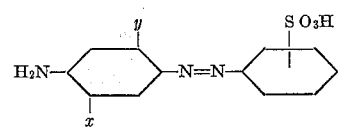

in which $x$ and $y$ stand for H, $CH_3$, or $OCH_3$, and in which the benzene radical carrying the sulfo-group may be substituted by $CH_3$, halogen or alkoxy, such as 4-amino-1:1'-azobenzene-4'-sulfonic acid. The sulfonic acid of the benzene series may be replaced by a sulfonic acid of the naphthalene series, for example by

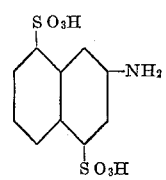

The aminoazo-dyestuff of the formula

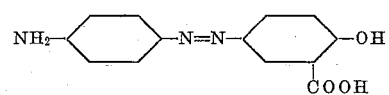

may be replaced quite generally by the dyestuffs which correspond to the general formula

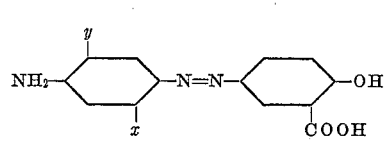

wherein $y$ stands for H, $CH_3$ or $OCH_3$, and $x$ stands also for H, $CH_3$ or $OCH_3$.

Such green dyestuffs are for example the dyestuffs corresponding to the following formulas:—

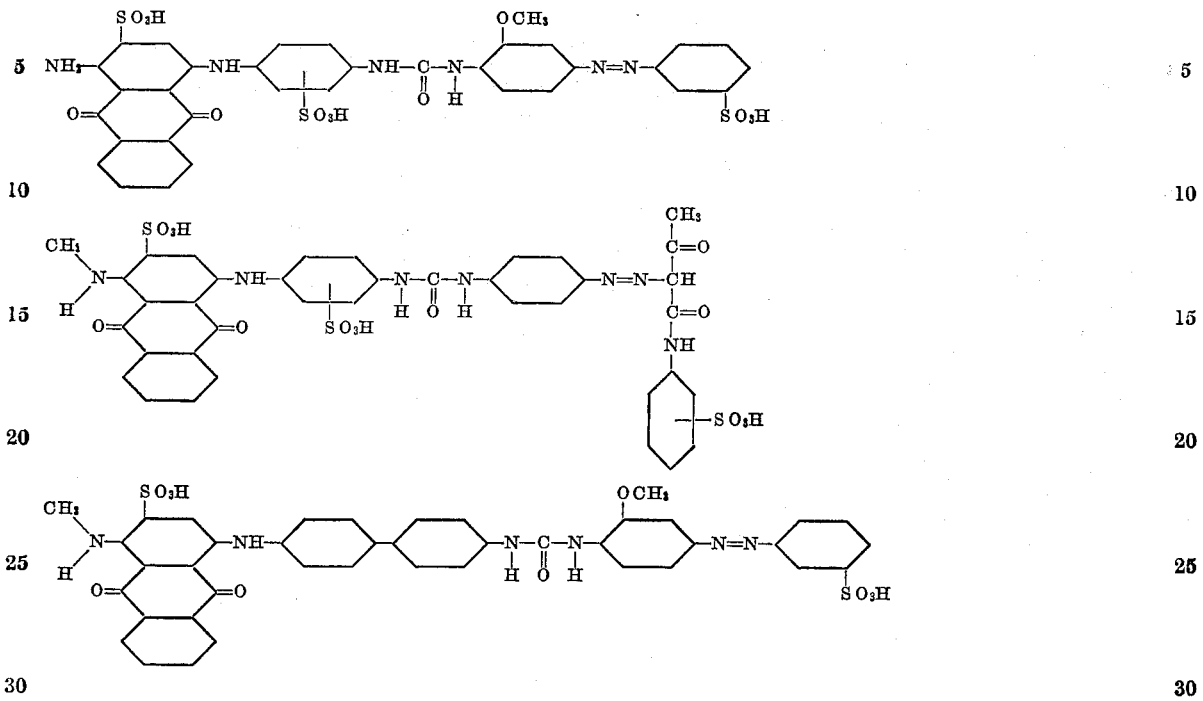

What we claim is:—

1. Process for the manufacture of dyestuffs, consisting in combining blue dyestuffs of the anthraquinone series of the general formula

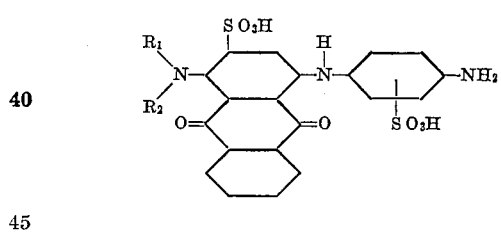

in which $R_1$ stands for a member of the group consisting of hydrogen, alkyl, aralkyl and aryl, and $R_2$ stands for a member of the group consisting of hydrogen and alkyl, with yellow mono-aminomono-azo-dyestuffs with the aid of phosgene.

2. Process for the manufacture of a dyestuff, consisting in combining a blue dyestuff of the anthraquinone series of the formula

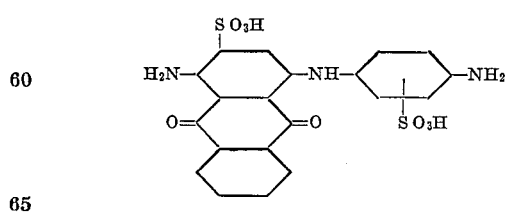

with the azo-dyestuff of the formula

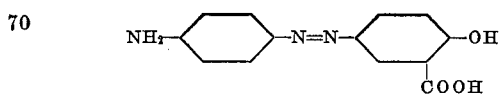

with the aid of phosgene.

3. The dyestuffs of the general formula

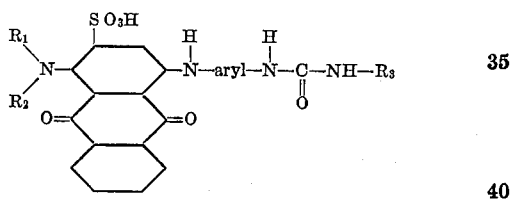

in which $R_1$ stands for a member of the group consisting of hydrogen, alkyl, aralkyl and aryl, $R_2$ stands for a member of the group consisting of hydrogen, alkyl and aralkyl, and $R_3$ stands for the radical of a yellow mono-amino-mono-azo-dyestuff, which products are dark powders dissolving in water to green solutions and dyeing textiles consisting of cellulose green tints.

4. The dyestuffs of the general formula

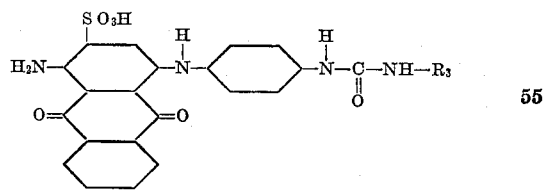

in which $R_3$ stands for the radical of a yellow mono-amino-mono-azo-dyestuff, which products are dark powders dissolving in water to green solutions and dyeing textiles consisting of cellulose green tints.

5. The dyestuffs of the general formula

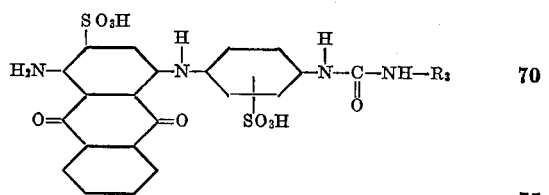

in which $R_3$ stands for the radical of a yellow mono-amino-mono-azo-dyestuff, which products are dark powders dissolving in water to green solutions and dyeing textiles consisting of cellulose green tints.

6. The dyestuff of the formula

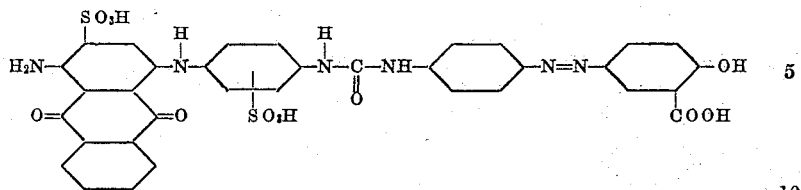

which products are dark powders dissolving in water to green solutions and dyeing textiles consisting of cellulose green tints.

HANS GUBLER.
EDUARD BERNASCONI.